(12) United States Patent
Takahashi (10) Patent No.: US 11,110,664 B2
(45) Date of Patent: Sep. 7, 2021

(54) METHOD FOR TREATING TERMINAL PORTION OF INTERIOR PART FOR VEHICLE

(71) Applicant: SHIGERU CO., LTD., Ota (JP)

(72) Inventor: Tomoya Takahashi, Ota (JP)

(73) Assignee: Shigeru Co., Ltd., Ota (JP)

(*) Notice: Subject to any disclaimer, the term of this patent is extended or adjusted under 35 U.S.C. 154(b) by 0 days.

(21) Appl. No.: 16/899,134

(22) Filed: Jun. 11, 2020

(65) Prior Publication Data
US 2020/0406561 A1 Dec. 31, 2020

(30) Foreign Application Priority Data

Jun. 27, 2019 (JP) .............................. JP2019-119346

(51) Int. Cl.
| | | |
|---|---|---|
| B29C 65/10 | (2006.01) | |
| B60R 13/02 | (2006.01) | |
| B29C 53/06 | (2006.01) | |
| B29K 675/00 | (2006.01) | |
| B29L 31/30 | (2006.01) | |
| B29L 31/58 | (2006.01) | |

(52) U.S. Cl.
CPC ............ *B29C 65/10* (2013.01); *B29C 53/066* (2013.01); *B60R 13/0231* (2013.01); *B29K 2675/00* (2013.01); *B29L 2031/3011* (2013.01); *B29L 2031/3041* (2013.01); *B29L 2031/58* (2013.01)

(58) Field of Classification Search
None
See application file for complete search history.

(56) References Cited

FOREIGN PATENT DOCUMENTS

| JP | 3545326 | B2 | 4/2004 |
|---|---|---|---|
| JP | 5294479 | B2 * | 9/2013 |
| JP | 5943350 | B2 | 6/2016 |

* cited by examiner

*Primary Examiner* — Barbara J Musser
(74) *Attorney, Agent, or Firm* — Brian B. Shaw, Esq.; Harter Secrest & Emery LLP (57) ABSTRACT

According to a method of the present invention for treating a terminal portion of an interior part for a vehicle, the terminal portion is stably maintained in a folded state by being welded firmly and deformation is constrained.

In a heating step, in a state where distal end edges of heat shield panels 30A and 30B are abutted against a boundary between a terminal portion 4 and an adjacent portion 5 of a peripheral edge portion 3 of an opening of a roof trim 1 for a sunroof, hot-air is provided toward a back surface of the terminal portion 4 from hot-air nozzles 40A and 40B, thereby softening the terminal portion 4 and melting the back surface of the terminal portion 4. In a folding-back step, the terminal portion 4 is folded back by pressing members 50A and 50B at the distal end edges of the heat shield panels 30A and 30B and then pressed against the adjacent portion 5, thereby welding the back surface of the terminal portion 4 to a back surface of the adjacent portion 5. A ventilation opening 32a is formed in the heat shield panel 30A disposed at a corner portion. In the heating step, a portion of the hot-air from the hot-air nozzle 40A is guided to the adjacent portion 5 through the ventilation opening 32a to heat the adjacent portion 5.

6 Claims, 5 Drawing Sheets

METHOD FOR TREATING TERMINAL PORTION OF INTERIOR PART FOR VEHICLE

FIELD OF THE INVENTION

The present invention relates to a method for treating a terminal portion of an interior part for a vehicle such as a terminal portion of a peripheral edge portion of an opening of a roof trim for a sunroof of a vehicle.

BACKGROUND OF THE INVENTION

In a vehicle having a sunroof, an opening is formed in a roof trim corresponding to an opening of a roof panel. To provide a good appearance, it is required to fold back a terminal portion of a peripheral edge portion of the opening of the roof trim to a back side.

Prior art methods disclosed in FIG. 7 of Patent Document 1 (Japanese Patent No. 3545326) and FIG. 7 of Patent Document 2 (Japanese Patent No. 5943350) include a step of heating a back surface of a terminal portion of a peripheral edge portion of an opening of a roof trim and a step of folding back the terminal portion and directly welding the back surface of the terminal portion to a back surface of an adjacent portion.

A method disclosed in FIGS. 1 to 6 of Patent Document 2 includes disposing a distal end edge of a heat shield panel along a boundary between a terminal portion and an adjacent portion of a peripheral edge portion of an opening of a roof trim, providing hot air to a back surface of the terminal portion from a hot-air nozzle in this state, thereby softening the terminal portion and melting the back surface of the terminal portion, and subsequently folding back the terminal portion with a pressing member, and thereby welding the terminal portion to a reinforcement panel adhered to a back surface of an area including the adjacent portion of the roof trim.

SUMMARY OF THE INVENTION

Problem to be Solved by the Invention

In the method disclosed in FIG. 7 of Patent Document 1 or FIG. 7 of Patent Document 2, deformation may easily occur particularly in corner portions of the peripheral edge portion of the opening.

In the method disclosed in FIGS. 1 to 6 of Patent Document 2, deformation is overcome. However, use of the reinforcement panel increases cost.

Means for Solving the Problems

To solve the problems mentioned above, the present invention provides a method for treating a terminal portion of an interior part for a vehicle, wherein the terminal portion is folded back to a back side thereof and welded to an adjacent portion adjacent to the terminal portion, the method including: a heating step wherein a hot air is provided from at least one hot-air nozzle toward a back surface of the terminal portion in a state in which a distal end edge of at least one heat shield panel is disposed along a boundary between the terminal portion and the adjacent portion and abutted against a back surface of the boundary, thereby softening the terminal portion and melting the back surface of the terminal portion; and a folding-back step wherein the terminal portion is folded back by at least one pressing member at the distal end edge of the at least one heat shield panel, and after making the at least one heat shield panel retreated, the terminal portion is pressed against the adjacent portion by the at least one pressing member, thereby welding the back surface of the terminal portion to a back surface of the adjacent portion, wherein a ventilation opening is formed in a selected heat shield panel of the at least one heat shield panel, and in the heating step, the ventilation opening is disposed in a position closer to the terminal portion than a blowoff end of the hot-air nozzle and a portion of the hot air from the hot-air nozzle is guided to the adjacent portion through the ventilation opening, thereby heating the adjacent portion.

According to the method mentioned above, the melted back surface of the terminal portion can be firmly welded to the adjacent portion because the part of the hot-air from the ventilation opening formed in the heat shield panel is provided to the adjacent portion to heat the adjacent portion. Moreover, since the terminal portion is folded back with a rigidity of the adjacent portion reduced by heating, deformation of the adjacent portion and a neighboring portion adjacent thereto can be constrained. Thus, good appearance from a vehicle interior side can be provided. Furthermore, since the terminal portion is folded back at the distal end edge of the heat shield panel, the method can proceed smoothly from the heating step to the folding-back step.

In one embodiment of the present invention, the interior part for the vehicle is a roof trim for a sunroof, the roof trim has an opening having a generally rectangular planar configuration formed therein, four corner portions of a peripheral edge portion of the opening are curved, and wherein the terminal portion of a substantially entire periphery of the peripheral edge portion is welded to the adjacent portion in the heating step and the folding-back step.

Preferably, the at least one heat shield panel comprises first heat shield panels respectively disposed in the four corner portions of the peripheral edge portion of the roof trim and second heat shield panels respectively disposed in four side portions of the peripheral edge portion, the distal end edge of the first heat shield panel curved corresponding to the corner portion, the distal end edge of the second heat shield panel extending along the side portion, wherein the at least one hot-air nozzle comprises first hot-air nozzles respectively disposed in the four corner portions of the peripheral edge portion of the roof trim and second hot-air nozzles respectively disposed in the four side portions of the peripheral edge portion, a planar configuration of the blow off end of the first hot-air nozzle is curved corresponding to the corner portion, the blow off end of the second hot-air nozzle extends along the side portion, and wherein the ventilation openings are formed at least in the first heat shield panels.

According to the method mentioned above, a deformation of the corner portions can be surely constrained since the adjacent portion is heated by the hot air from the ventilation opening of the heat shield panel at corner portions, where a relatively strong stress may be generated when the terminal portion is folded back.

More specifically, the peripheral edge portion is inclined toward an inside of the opening in an upward direction and includes the terminal portion and the adjacent portion, wherein the method further comprises a setting step before the heating step, the roof trim being set in a receiving base in the setting step, the receiving base including an annular raised portion having a planar configuration corresponding to the peripheral edge portion of the roof trim, an outer peripheral surface of the raised portion provided as a support surface inclined corresponding to the peripheral edge portion, and wherein in the setting step, the adjacent portion of the peripheral edge portion of the roof trim is supported by the support surface of the raised portion and the terminal portion is protruded from the raised portion.

According to the method mentioned above, terminal treatment of the roof trim for the sunroof can be performed well.

More specifically, the at least one pressing member comprises first pressing members respectively disposed in the four corner portions of the peripheral edge portion of the roof trim and second pressing members respectively disposed in the four side portions of the peripheral edge portion, a planar configuration of the first pressing member is curved corresponding to the corner portion and the second pressing member extends along the side portion, wherein each of the first pressing members and the second pressing members includes a vertically extending first pressing surface on an outside thereof, a horizontally extending second pressing surface on a lower side thereof and an inclined third pressing surface on an inside thereof, and wherein in the folding-back step, the first pressing surface folds back the terminal portion in a course of a horizontal movement of the first and second pressing members from inside of the peripheral edge portion of the roof trim toward outside thereof, the second pressing surface bends the terminal portion to bring the terminal portion closer to the adjacent portion in a course of a downward movement of the first and second pressing members and the third pressing surface presses the terminal portion and the adjacent portion toward the support surface of the raised portion of the receiving base.

According to the method mentioned above, the terminal portion can be folded back well throughout an entire periphery of the peripheral edge portion of the roof trim.

Preferably, a plurality of the ventilation openings are formed in the first heat shield panel in a vicinity of the distal end edge spaced from each other along the distal end edge.

According to the method mentioned above, an adjacent portion at the corner portion can be generally evenly heated.

Advantageous Effects of the Invention

According to the present invention, the terminal portion can be stably maintained in a folded state by welding the terminal portion to the adjacent portion. Furthermore, deformation of the adjacent portion and a neighboring portion adjacent thereto can be constrained.

DETAILED DESCRIPTION OF THE INVENTION

Figure 1:
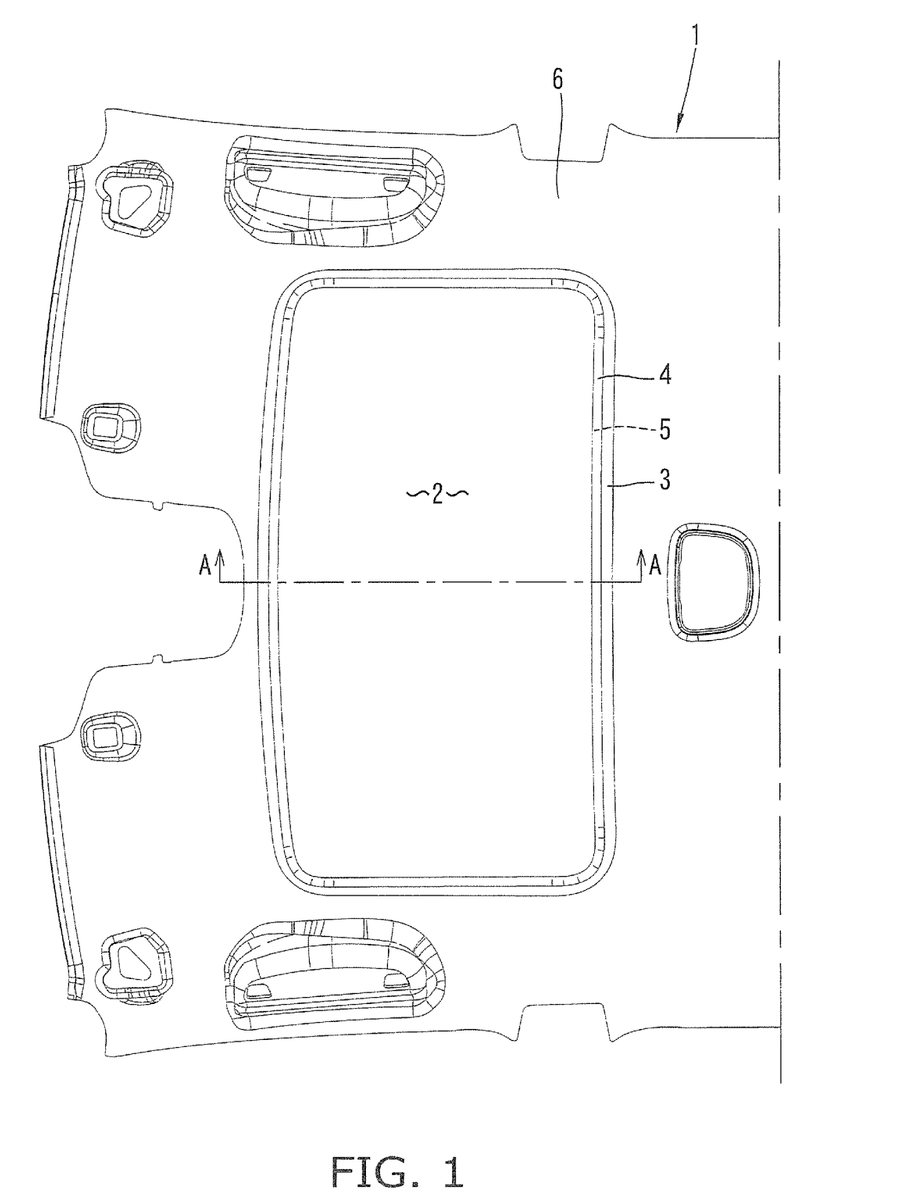
FIG. 1 is a plan view of a roof trim for a sunroof that was treated according to a terminal treating method of the present invention.

One embodiment of the present invention will be described hereinafter with reference to the drawings. As shown in FIG. 1, a roof trim 1 (interior part for a vehicle) for a sunroof has an opening 2 having a generally rectangular configuration corresponding to that of an opening (not shown) of a roof panel. Corner portions of a peripheral edge portion 3 of the opening 2 are curved.

Figure 2A:
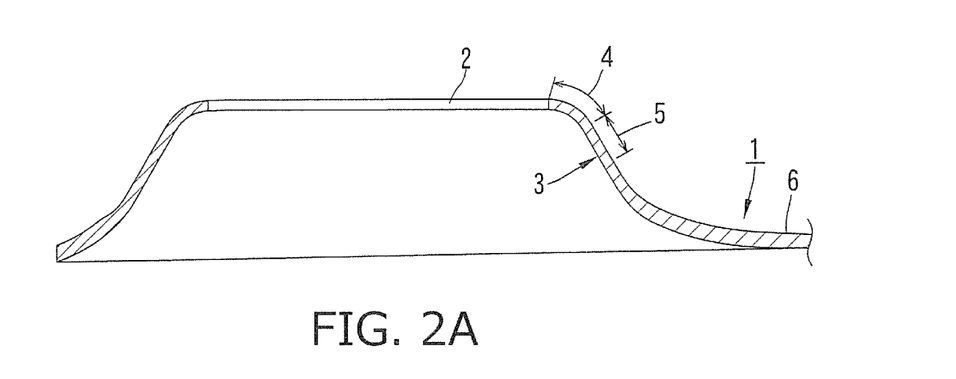
FIG. 2A is a cross-sectional view taken along line A-A of FIG. 1, showing a terminal portion of a peripheral edge portion of an opening in a state before being folded back.

As show in FIG. 2A, the peripheral edge portion 3 of the opening 2 is inclined inward in an upward direction. The peripheral edge portion 3 has a terminal portion 4 in an upper end portion and an adjacent portion 5 adjacent to the terminal portion 4.

Figure 2B:
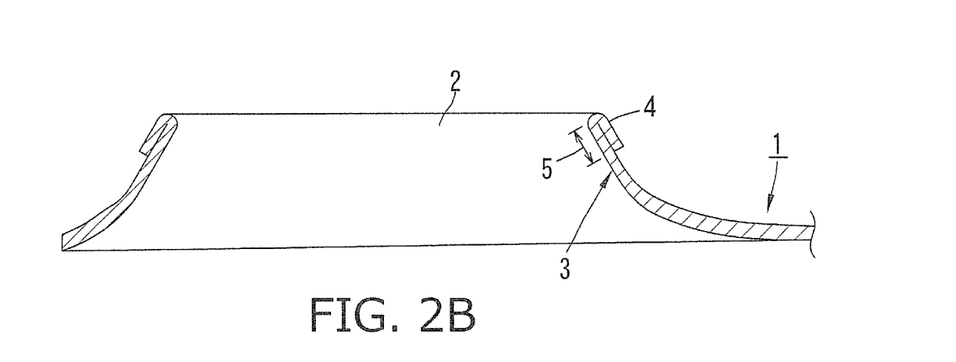
FIG. 2B is a figure corresponding to FIG. 2A, showing the terminal portion of the peripheral edge portion of the opening in a state after being folded back.

As shown in FIG. 2B, the terminal portion 4 is folded back toward outside (back side) and welded to a back side of the adjacent portion 5.

Figure 3:
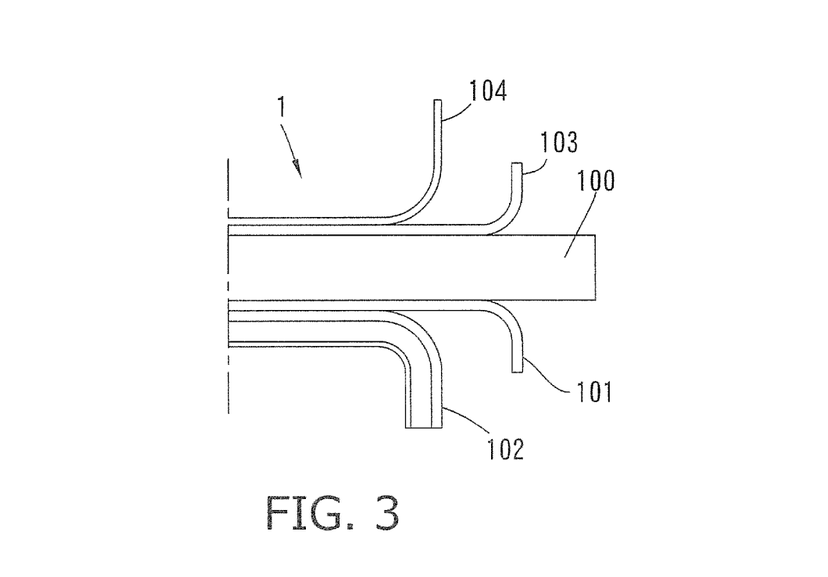
FIG. 3 is an enlarged cross-sectional view of the roof trim, showing a laminated structure thereof.

One example of a laminating structure of the roof trim 1 is described hereinafter with reference to FIG. 3. The roof trim 1 has a substrate 100 made of molded urethane foam. A skin 102 is laminated on a front side (vehicle interior side, lower side) of the substrate 100 via a glass fiber layer 101. A lining 104 is laminated on a back side (vehicle exterior side, upper side) of the substrate 100 via a glass fiber layer 103. The skin 102 and the lining 104 are adhered to the substrate 100 with an adhesive impregnated in the glass fiber layers 101, 103. The lining 104 is composed of a layer of a low-melting-point resin. The skin 102 has a three-layer structure composed of an inner layer made of resin, a middle layer made of urethane foam and an outer layer made of a woven fabric, a knitted fabric, or the like.

As shown in FIGS. 2A and 2B, the peripheral edge portion 3 of the roof trim 1 is made thinner than the other portion, i.e., a main portion 6 for enhancing workability. The peripheral edge portion 3 is made thinner by making the substrate 100 thinner.

A method for treating the terminal portion 4 is described step-by-step hereinafter with reference to FIGS. 4 and 5.

Roof Trim Setting Step

Figure 4:
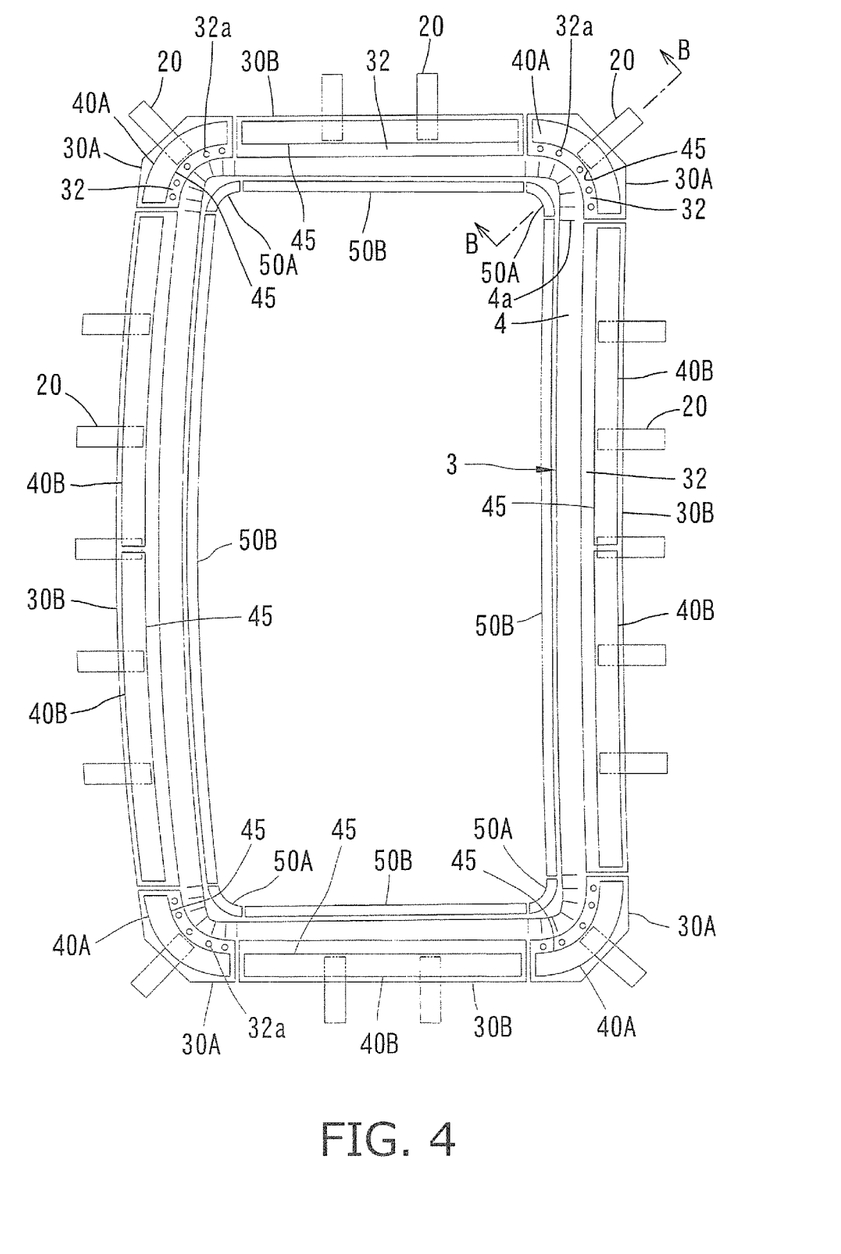
FIG. 4 is a plan view, showing a step in which the terminal portion of the peripheral edge portion of the opening is heated with hot air.
Figure 5A:
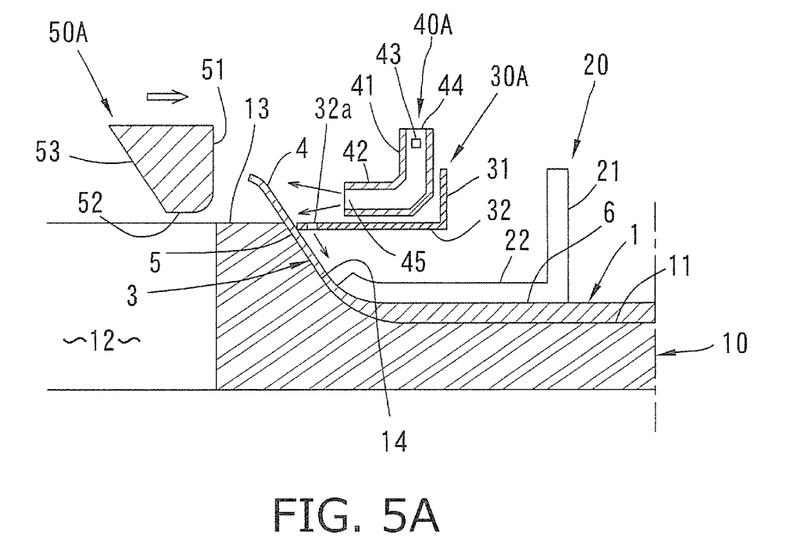
FIG. 5A is a cross-sectional view taken along line B-B of FIG. 4 showing the heating step, showing the roof trim set in a receiving base.

As shown in FIGS. 4 and 5A, the roof trim 1 is set in a receiving base 10. The receiving base 10 has a mounting surface 11 to mount the main portion 6 of the roof trim 1 thereon and an opening 12 corresponding to the opening 2 of the roof trim 1. An entire periphery of a peripheral edge portion of the opening 12 is raised upwards, constituting a raised portion 13. The raised portion 13 has a planar configuration corresponding to that of the peripheral edge portion 3 of the roof trim 1, with curved corner portions. Outer peripheral surface of the raised portion 13 is provided as a support surface 14 inclined corresponding to the peripheral edge portion 3 of the roof trim 1.

In the set state mentioned above, the peripheral edge portion 3 of the roof trim 1 is abutted against the support surface 14 of the raised portion 13 of the receiving base 10. The terminal portion 4 of the peripheral edge portion 3 is protruded upwards from a flat upper surface of the raised portion 13 of the receiving base 10.

In FIG. 4, the receiving base 10 is not shown to simplify the drawing. Of the roof trim 1, only the terminal portion 4 is shown. A plurality of slits 4a are formed in a radial fashion in the terminal portion 4 of the corner portion. In FIG. 4, the slits 4a are depicted by straight lines to simplify the drawing.

Heating Preparation Step

Subsequently, as shown in FIGS. 4 and 5A, support members 20, first and second heat shield panels 30A, 30B and first and second hot-air nozzles 40A, 40B are moved downward from an upper initial position to an acting position. As to first and second pressing members 50A, 50B, positions shown in FIGS. 4 and 5A are initial positions.

The support member 20 having a L-shaped configuration has a vertically extending attachment portion 21 and a pressing portion 22 horizontally extending from a lower end of the attachment portion 21 toward the raised portion 13 of the receiving base 10. As shown in FIG. 4, in the acting position, the support members 20 are disposed outside of the four corner portions of the peripheral edge portion 3 of the roof trim 1. A plurality of the support members 20 are also disposed outside of each of four side portions of the peripheral edge portion 3 along the side portions spaced from each other. The attachment portions 21 of all of the support members 20 are attached to a common vertically moving mechanism that is not shown. In the acting position, the pressing portions 22 of the support members 20 press a neighboring portion of the main portion 6 of the roof trim 1 adjacent to the peripheral edge portion 3 toward the mounting surface 11 of the receiving base 10. A distal end portion of the pressing portion 22 is curved obliquely upward, and the distal end portion presses a proximal portion of the peripheral edge portion 3 of the roof trim 1 as well.

The first heat shield panels 30A are disposed outside of the four corner portions of the peripheral edge portion 3 of the roof trim 1. The second heat shield panels 30B are disposed outside of the four side portions of the peripheral edge portion. The first and second heat shield panels 30A, 30B are formed by bending flat panels made of metal. Each of the first and second heat shield panels 30A, 30B has an attachment portion 31 extending vertically and a heat shield portion 32 extending horizontally from a lower end of the attachment portion 31 toward a peripheral edge portion 3 of the roof trim 1. The attachment portions 31 of the first and the second heat shield panels 30A, 30B are respectively attached to horizontally moving mechanisms independent from each other. These horizontally moving mechanisms are supported by a common vertically moving mechanism.

A distal end edge of the heat shield portion 32 of the first heat shield panel 30A is curved along the corresponding corner portion of the peripheral edge portion 3 of the roof trim 1. In the acting position, the distal end edge of the heat shield portion 32 of the first heat shield panel 30A is at a generally same height as an upper end of the raised portion 13 of the receiving base 10. The distal end edge of the heat shield portion 32 is disposed along a boundary between the terminal portion 4 and the adjacent portion 5 at a back surface of the peripheral edge portion 3 with the distal end edge abutted against the boundary.

A distal end edge of the heat shield portion 32 of the second heat shield panel 30B extends along the side portions of the peripheral edge portion 3 of the roof trim 1. In the acting position, the distal end edge of the heat shield portion 32 of the second heat shield panel 30B is at a generally same height as the upper end of the raised portion 13 of the receiving base 10. The distal end edge of the heat shield portion 32 is disposed along a boundary between the terminal portion 4 and the adjacent portion 5 at a back surface of the peripheral edge portion 3 with the distal end edge abutted against the boundary.

A plurality of ventilation openings 32a are formed in a neighboring portion of the first heat shield panel 30A adjacent to the distal end edge of the heat shield portion 32. The ventilation openings 32a are arranged along the distal end edge spaced from each other.

The first hot-air nozzles 40A are disposed outside of the four corner portions of the peripheral edge portion 3 of the roof trim 1. The second hot-air nozzles 40B are disposed outside of the four side portions of the peripheral edge portion 3. The second hot-air nozzles 40B located outside of long side portions are divided into two parts.

Each of the first and second hot-air nozzles 40A, 40B includes a first portion 41 having a configuration of a hollow plate extending vertically and a second portion 42 having a configuration of a hollow plate extending horizontally from a lower end of the first portion 41 toward the peripheral edge portion 3. A heater 43 is built in the first portion 41. An upper end of the first portion 41 is provided as a connection end 44 that is connected to a common blower (not shown) and receives air from the blower. A distal end of the second portion 42 is provided as a blow-off end 45 from where hot-air is blown out.

The blow-off end 45 of the second portion 42 of the first hot-air nozzle 40A is curved along the corresponding corner portion of the peripheral edge portion 3 of the roof trim 1. The blow-off end 45 of the second portion 42 of the second hot-air nozzle 40B extends along the side portion of the peripheral edge portion 3. The blow-off end 45 of the first hot-air nozzle 40A is located farther from the peripheral edge portion 3 of the roof trim 1 compared with the ventilation openings 32a of the first heat shield panel 30A.

The first pressing members 50A are disposed inside of the four corner portions of the peripheral edge portion 3 of the roof trim 1. The first pressing members 50A have planar configurations that are curved corresponding to the corner portions. The second pressing members 50B are disposed inside of the four side portions of the peripheral edge portion 3 and extend along the side portions.

The first and second pressing members 50A, 50B have same cross-sectional configurations. Each of the first and second pressing members 50A, 50B has a vertically extending first pressing surface 51 on an outer side thereof, a horizontally extending second pressing surface 52 on a lower side thereof and an inclined third pressing surface 53 on an inner side thereof.

Heating Step

Air sent from the common blower to the connection ends 44 of the first and second hot-air nozzles 40A, 40B is heated to a high temperature by the heater 43 and blown out from the blow-off end 45. As shown in FIG. 5A, the hot air heats the terminal portion 4 protruded from the raised portion 13 of the receiving base 10, softening the entirety of the terminal portion 4 and melting a back surface of the terminal portion 4. At this time, a portion of the hot air from the first hot-air nozzle 40A is also provided to the back side of the adjacent portion 5 at the corner portion through the ventilation openings 32a. Thereby, the adjacent portion 5 is also heated and rigidity thereof is reduced. However, since an amount of the hot air provided through the ventilation openings 32a is limited, an amount of heat provided to the adjacent portion 5 is much smaller than an amount of heat provided to the terminal portion 4.

First-Stage of Folding-Back Step (Step of Horizontally Bending the Terminal Portion)

Figure 5B:
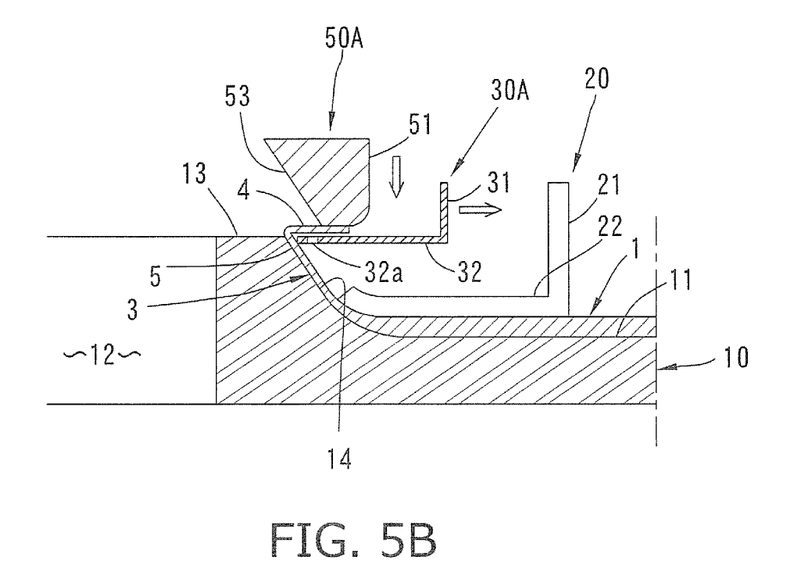
FIG. 5B is a cross-sectional view, showing a first stage of a folding-back step that is executed following the heating step shown in FIG. 5A.

Next, the first and second hot-air nozzles 40A, 40B are lifted and retreated to the initial position. Immediately after the hot-air nozzles 40A, 40B are retreated, as indicated by an arrow of FIG. 5A, the first pressing member 50A is horizontally moved from the inner side of the corner portion of the peripheral edge portion 3 of the roof trim 1 toward the outer side thereof and the second pressing member 50B is horizontally moved from the inner side of the side portion of the peripheral edge portion 3 toward the outer side thereof. Thereby, as shown in FIG. 5B, the terminal portion 4 is pressed by the first pressing surfaces 51 of the first and second pressing members 50A, 50B and bent horizontally to the outside. Since the distal end edges of the first and second heat shield panels 30A, 30B are abutted against the boundary between the terminal portion 4 and the adjacent portion 5 at this time, the terminal portion 4 can be bent smoothly at the distal end edge of the first and second heat shield panels 30A, 30B.

In a state in which the terminal portion 4 is bent horizontally, a slight gap is formed between the heat shield portion 32 of the first and second heat shield panels 30A, 30B and the terminal portion 4. The first and second heat shield panels 30A, 30B are moved horizontally immediately after (or immediately before) the horizontal bending of the terminal portion 4 and retreated from the peripheral edge portion 3 of the roof trim 1, and after being moved further upward, returns to the initial position.

Latter-Stage of Folding-Back Step (Welding Step)

After the heat shield panels 30A, 30B are retreated, as indicated by the arrow of FIG. 5B, the first and second pressing members 50A, 50B are moved downward and the second pressing surfaces 52 further press the terminal portion 4. Thereby, the terminal portion 4 is bent further. Finally, the inclined third pressing surfaces 53 press the terminal portion 4 and the adjacent portion 5 against the support surface 14 of the raised portion 13 (refer to FIG. 5C). Since the back surface of the terminal portion 4 is in a melted state, the terminal portion 4 is welded to a back surface of the adjacent portion 5.

Figure 5C:
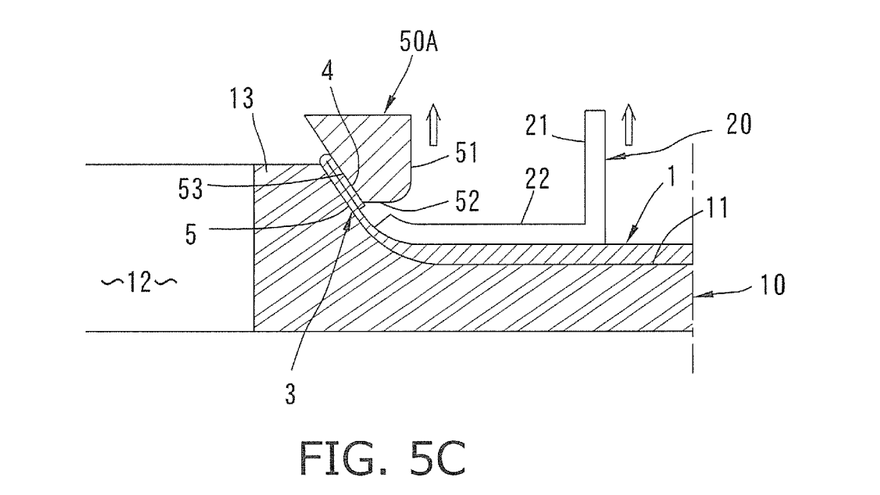
FIG. 5C is a cross-sectional view, showing a latter stage of the folding-back step.

When the terminal portion 4 is folded back, a greater stress is generated in the corner portions of the peripheral edge portion 3 than in the side portions thereof. However, since the adjacent portion 5 (particularly the neighboring portion adjacent to the boundary between the terminal portion 4 and the adjacent portion 5) is heated by the hot air from the ventilation openings 32a and softened (however, to a lower degree of softening than the terminal portion 4), the adjacent portion 5 can follow the terminal portion 4 while the terminal portion 4 is being bent. Therefore, excessive stress will not be generated. As a result, deformation of the adjacent portion 5 and the neighboring portion adjacent thereto at the corner portion can be constrained. Thus, good appearance from a vehicle interior side can be maintained.

Final Step

Figure 5D:
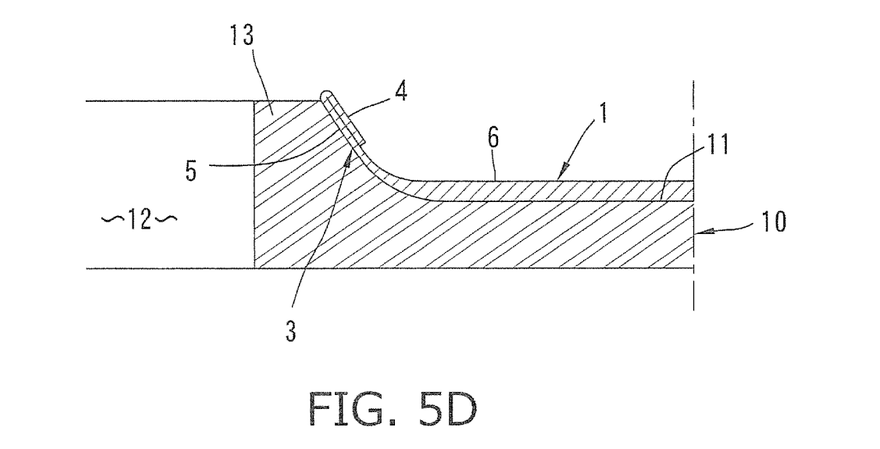
FIG. 5D is a cross-sectional view, showing the roof panel left in the receiving base after the terminal treatment has been completed.

Finally, the support member 20 is moved upward to be returned to the initial position. The pressing members 50A, 50B are returned to the initial positions via reverse routes from those mentioned above. As a result, as shown in FIG. 5D, the roof trim 1 that has received terminal treatment is left on the receiving base 10 in an open state.

The present invention is not limited to the embodiments described above, and various modifications may be adopted.

Depending on a material of the roof trim, the ventilation openings may be formed in the second heat shield panel as well as in the first heat shield panel.

The ventilation opening may have a configuration of a slit extending along the distal end edge of the heat shield panel.

Application of the method of the present invention is not limited to a roof trim for a sunroof. The present invention may be applied to a treatment of a terminal portion of other interior parts for a vehicle.

INDUSTRIAL APPLICABILITY

The present invention is applicable to a terminal treatment of an interior part for a vehicle such as a roof trim.

The invention claimed is:

1. A method for treating a terminal portion of an interior part for a vehicle, wherein the terminal portion is folded back to a back side thereof and welded to an adjacent portion adjacent to the terminal portion, the method comprising:
    a heating step wherein a hot air is provided from at least one hot-air nozzle toward a back surface of the terminal portion in a state in which a distal end edge of at least one heat shield panel is disposed along a boundary between the terminal portion and the adjacent portion and abutted against a back surface of the boundary, thereby softening the terminal portion and melting the back surface of the terminal portion; and
    a folding-back step wherein the terminal portion is folded back by at least one pressing member at the distal end edge of the at least one heat shield panel, and after making the at least one heat shield panel retreated, the terminal portion is pressed against the adjacent portion by the at least one pressing member, thereby welding the back surface of the terminal portion to a back surface of the adjacent portion,
    wherein a ventilation opening is formed in a selected heat shield panel of the at least one heat shield panel, and in the heating step, the ventilation opening is disposed in a position closer to the terminal portion than a blowoff end of the hot-air nozzle and a portion of the hot air from the hot-air nozzle is guided to the adjacent portion through the ventilation opening, thereby heating the adjacent portion.

2. The method according to claim 1, wherein the interior part for the vehicle is a roof trim for a sunroof, the roof trim has an opening having a generally rectangular planar configuration formed therein, four corner portions of a peripheral edge portion of the opening are curved, and wherein the terminal portion of a substantially entire periphery of the peripheral edge portion is welded to the adjacent portion in the heating step and the folding-back step.

3. The method according to claim 2, wherein the at least one heat shield panel comprises first heat shield panels respectively disposed in the four corner portions of the peripheral edge portion of the roof trim and second heat shield panels respectively disposed in four side portions of the peripheral edge portion, the distal end edge of the first heat shield panel curved corresponding to the corner portion, the distal end edge of the second heat shield panel extending along the side portion,
    wherein the at least one hot-air nozzle comprises first hot-air nozzles respectively disposed in the four corner portions of the peripheral edge portion of the roof trim and second hot-air nozzles respectively disposed in the four side portions of the peripheral edge portion, a planar configuration of the blow off end of the first hot-air nozzle is curved corresponding to the corner portion, the blow off end of the second hot-air nozzle extends along the side portion, and wherein the ventilation openings are formed at least in the first heat shield panels.

4. The method according to claim 3, wherein the peripheral edge portion is inclined toward an inside of the opening in an upward direction and includes the terminal portion and the adjacent portion, wherein the method further comprises a setting step before the heating step, the roof trim being set in a receiving base in the setting step, the receiving base including an annular raised portion having a planar configuration corresponding to the peripheral edge portion of the roof trim, an outer peripheral surface of the raised portion provided as a support surface inclined corresponding to the peripheral edge portion, and wherein in the setting step, the adjacent portion of the peripheral edge portion of the roof trim is supported by the support surface of the raised portion and the terminal portion is protruded from the raised portion.

5. The method according to claim 4, wherein the at least one pressing member comprises first pressing members respectively disposed in the four corner portions of the peripheral edge portion of the roof trim and second pressing members respectively disposed in the four side portions of the peripheral edge portion, a planar configuration of the first pressing member is curved corresponding to the corner portion and the second pressing member extends along the side portion, wherein each of the first pressing members and the second pressing members includes a vertically extending first pressing surface on an outside thereof, a horizontally extending second pressing surface on a lower side thereof and an inclined third pressing surface on an inside thereof, and wherein in the folding-back step, the first pressing surface folds back the terminal portion in a course of a horizontal movement of the first and second pressing members from inside of the peripheral edge portion of the roof trim toward outside thereof, the second pressing surface bends the terminal portion to bring the terminal portion closer to the adjacent portion in a course of a downward movement of the first and second pressing members and the third pressing surface presses the terminal portion and the adjacent portion toward the support surface of the raised portion of the receiving base.

6. The method according to claim 3, wherein a plurality of the ventilation openings are formed in the first heat shield panel in a vicinity of the distal end edge spaced from each other along the distal end edge.

* * * * *